No. 780,187. PATENTED JAN. 17, 1905.
A. HULTQVIST.
COMBINED STARTING AND BRAKING DEVICE FOR ELECTRIC MOTORS.
APPLICATION FILED JUNE 9, 1904.
3 SHEETS—SHEET 1.
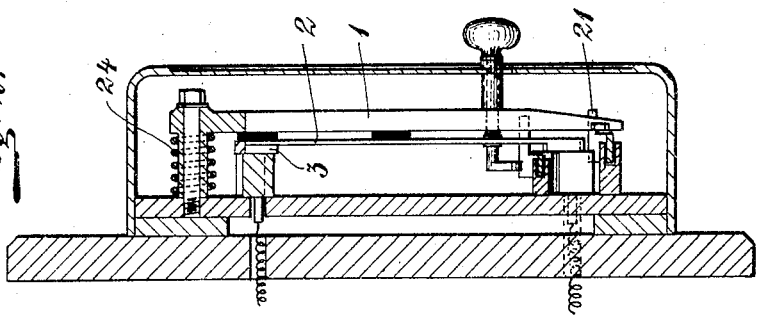
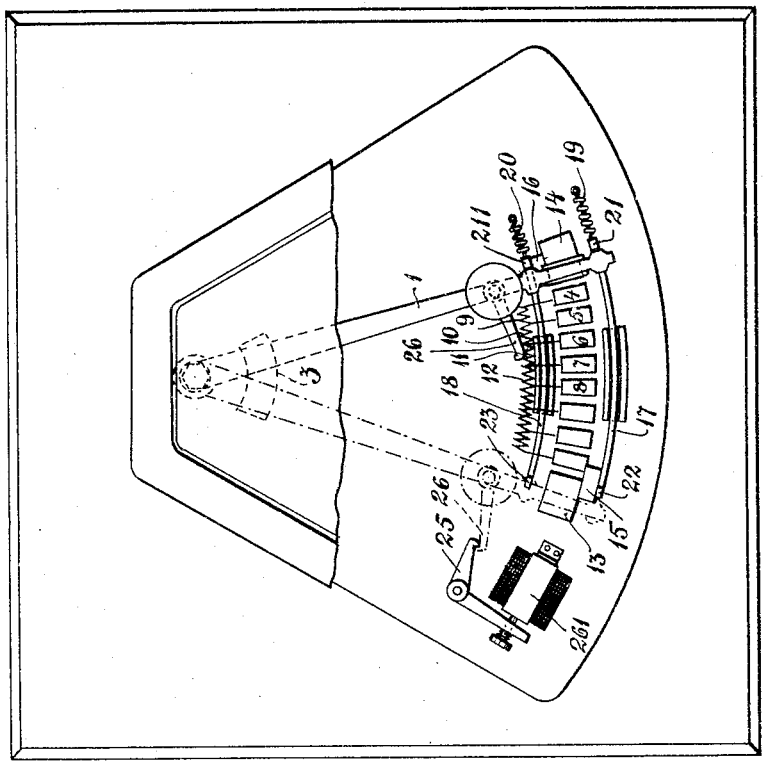
Witnesses:
Inventor:

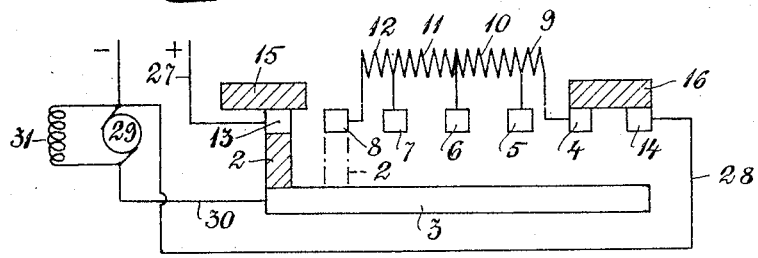
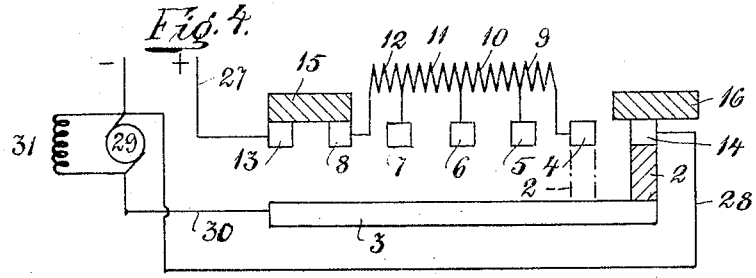
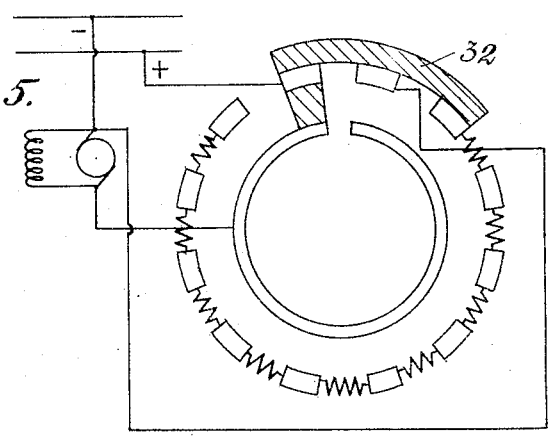

No. 780,187.  Patented January 17, 1905.

UNITED STATES PATENT OFFICE.

ARTHUR HULTQVIST, OF GOTHENBURG, SWEDEN.

COMBINED STARTING AND BRAKING DEVICE FOR ELECTRIC MOTORS.

SPECIFICATION forming part of Letters Patent No. 780,187, dated January 17, 1905.

Application filed June 9, 1904. Serial No. 211,760.

*To all whom it may concern:*

Be it known that I, ARTHUR HULTQVIST, a subject of the King of Sweden and Norway, and a resident of Gothenburg, Sweden, have invented new and useful Improvements in a Combined Starting and Braking Device for Electric Motors, of which the following is a specification, reference being had to the drawings accompanying and forming a part hereof.

This invention relates to a combined starting and braking device for electric motors.

The object of the invention is to provide an apparatus which can serve as starting device for electric motors as well as automatical braking device in case of accident.

The invention consists, chiefly, in the provision of one or more switches in combination with a starting resistance arranged to automatically return into the zero position when released, the said switches being arranged to be operated by the movable member of the starting device when the said member approaches its end positions in such manner that the said switches will effect the changing of the motor to generator, or vice versa, while connecting the starting resistance in circuit, the latter being thereupon gradually disconnected when the starting device is moved into the opposite end position.

In the accompanying drawings I have shown some embodiments of my invention.

Figure 6:
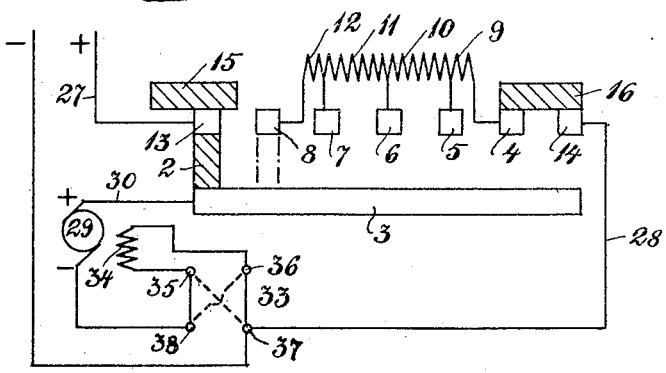
Figure 7:
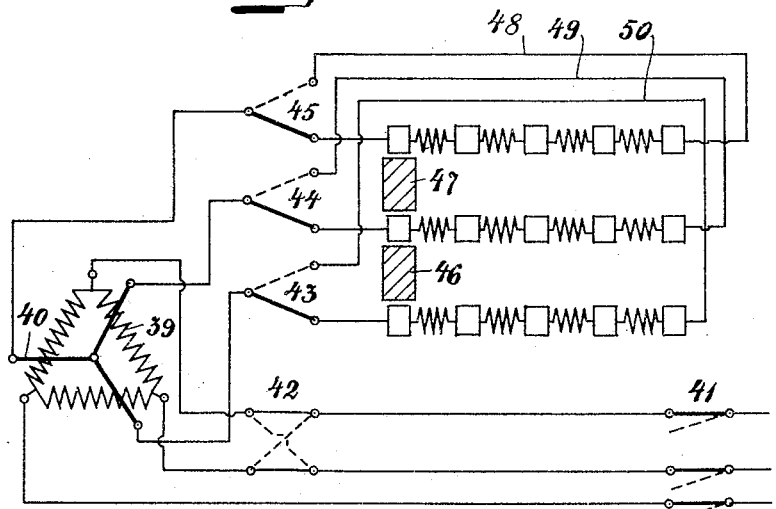

Figure 1 shows a plan view of a combined starting and braking device for a shunt-motor, the cover being partly removed. Fig. 2 shows a section of the same. Fig. 3 is a diagram showing the connections in an apparatus of the kind shown in Figs. 1 and 2 while in working or operative position. Fig. 4 shows the same in braking position when the resistances have been disconnected. Fig. 5 shows a modification of the connections shown in Figs. 3 and 4. Fig. 6 shows a combined starting and braking device for a series-wound motor, and Fig. 7 shows a similar device for an asynchronous motor.

Referring to Figs. 1 and 2, the starting resistance is arranged in the ordinary manner, the same being provided with a switch-arm 1, to the under side of which is secured an insulated contact-plate 2, bearing on a stationary contact-plate 3, adapted to be connected to the one pole of the motor, and on the resistance-contacts 4 5 6 7 8, &c., between which the resistances 9 10 11 12, &c., are inserted. Outside the last resistance-contact is provided an end contact 13, adapted to be connected to the one pole of the electric source of current, and outside the first resistance-contact is provided another end contact 14, adapted to be connected to the other pole of the motor, the said pole being also directly connected to the source of current. At the end contacts are arranged contact-pieces 15 and 16, which are supported by insulated bars or the like 17 and 18 and are arranged to be operated by the movable switch-arm 1 in the end positions of the latter in such manner that the contact-piece 15 will in the zero position of the said switch-arm 1 establish connection between the end contact 13 and the nearest resistance-contact, while the contact-piece 16 is only in contact with the end contact 14. The bars 17 and 18, with the contacts 15 and 16, are hereby in the outermost position to the right and are kept in this position by means of springs 19 and 20, and thereby the switch-arm 1 bears against shoulders 21, 211, or the like at the ends of the bars 17 and 18. When the switch-arm has been moved into the operative position, (shown by dotted lines in Fig. 1,) the said arm will have moved the bars 17 and 18 to the left by operating shoulders 22 23 at the left-hand ends of the said bars, so that the contact-piece 15 will then only be in contact with the end contact 13, while the contact-piece 16 will connect the end contact 14 to the nearest resistance-contact. The contact-pieces 15 and 16 will remain in this position until the switch-arm 1 has returned into the zero position, when they will again be moved into their right-hand positions. The contact-pieces 15 and 16, together with the end contacts 13 and 14, hereby work as switches which alternately connect in the circuit the one supply-line or a short-circuiting wire. The changes in the operative conditions resulting therefrom will be more particularly explained with reference to Figs. 3 and 4.

In order that the starting resistance may work as an automatic braking device by means of which the motor or motors may be brought to stop quickly, the switch-arm 1 may be under the action of a spiral spring 24, tending to return the switch-arm into zero position. In the operative position the switch-arm is retained by a pawl 25 engaging a hook-shaped projection 26 on the said switch-arm. The said pawl 25 is secured to the armature of a solenoid or electromagnet 261, the winding of which is in well-known manner inserted in a safety-circuit by the closing or breaking of which the pawl 25 is released from the said hook-shaped projection 26, so that the switch-arm 1, under the influence of the spring 24, will return into the zero position.

Figs. 3 and 4 show the connections in an apparatus of the kind illustrated in Figs. 1 and 2, corresponding parts being indicated by the same reference-numerals. The end contact 13 is connected to the positive pole of the source of current by means of a wire 27, while the end contact 14 is by a wire 28 connected to the negative pole of the motor 29, to which also the negative pole of the source of current is directly connected. The contact-plate 3 is by a wire 30 connected to the positive pole of the motor. The shunt-wire of the motor is indicated by 31.

In the position of the contact-plate 2 shown by full lines in Fig. 3 the apparatus is in operative position. The circuit is as follows: The current flows from the positive pole of the source of current through wire 27, contact 13, contact-plate 2, contact-plate 3, wire 30, and motor 29, to the negative pole of the source of current. The machine will thus run without resistance as motor. If the safety-circuit be closed or broken, so that the switch-arm is released, the contact-plate 2 will be moved to the right. When the same has left the end contact 13 and been moved to the nearest resistance-contact, the positive pole of the source of current is disconnected, and the circuit is now as follows: from the positive pole of the motor, through wire 30, contact-plate 3, contact-plate 2, contact 8, all resistances 12, 11, 10, and 9, contact 4, contact-piece 16, end contact 14, and wire 28, to the negative pole of the motor 29. The latter is thus connected in a local circuit, and as the direction of the current is reversed in the inductor, but unchanged in the shunt-wire, it is obvious that the torque of the machine will work in the opposite direction to that of the rotation and that thus the machine will be braked. In the continued movement of the switch-arm toward the zero position the resistances 12 to 9 will be successively disconnected until the switch-arm has reached the zero position, Fig. 4. In this position the motor is short-circuited and the contact-pieces 15 and 16 are in their right-hand end positions. When the motor again is to be started, the switch-arm 1 is moved to the left. When the contact-plate 2 arrives in the position shown by dotted lines in Fig. 4, the path of the current will be as follows: from the positive pole of the source of current, through wire 27, contact 13, contact-piece 15, contact 8, resistances 12, 11, 10, and 9, contact 4, contact-plate 2, contact-plate 3, wire 30, and motor 29, to the negative pole of the source of current. In the continued movement of the contact-plate 2 toward the left the resistances 9, 10, 11, and 12 will be successively disconnected until the operative position, Fig. 3, is reached, in which the contact-pieces 15 and 16 are again in their left-hand end positions.

In the diagram shown in Fig. 5 the switch-arm is supposed to be turnable almost a whole revolution, whereby for the contact-pieces 15 and 16 may be substituted a single piece 32. In other respects the device and its working are the same as described with reference to Figs. 3 and 4. It is obvious that for the contact-pieces 15 and 16 or 32 may be substituted other suitable switching devices capable of effecting the desired connections under the influence of the movable member of the resistance apparatus.

In Fig. 6 is shown a diagram for a series-wound motor, with combined starting and braking device, in accordance with the present invention. The arrangement of the starting-resistance is the same as that shown in Figs. 3 and 4. In order to prevent in this device the polarity of the field from being changed when the motor is changed to generator, or vice versa, there is arranged a pole-changer 33, having four fixed contacts and adapted to be operated, by means of suitable devices, by the movable member of the starting device when the same reaches either of its end positions, whereby the said pole-changer will each time change the connections for the field-magnet winding 34. The latter is connected to two of the terminals of the said pole-changer 35 36 and the wire 28 to the third contact 37, which is also connected to the negative pole of the source of current, while the fourth contact 38 is connected to the negative pole of the motor. In the position shown the motor, with the starting and barking apparatus, is in operative position. The path of the current is as follows: from the positive pole of the source of current through wire 27, end contact 13, contact-plate 2, contact-plate 3, wire 30, the inductor of motor 29, contacts 38 and 35 of the pole-changer, series winding 34, contacts 36 and 37 of the pole-changer, to the negative pole of the source of current. When the switch-arm of the starting resistance is released by closing or breaking the safety-circuit, so that the said arm, together with the contact-plate 2, is moved to the right, the contact-plate 2 is brought into contact with the resistance-contact 8, and at the same time the pole-changer 33 will be reversed under the influence of the movable member of the starting device, so that the connections in the pole-changer will be those shown by dotted lines. The path of the current is then as follows: from the positive pole of the motor through wire 30, contact-plate 3, contact-plate 2, contact 8, resistances 12, 11, 10, and 9, contact 4, contact-piece 16, end contact 14, wire 28, contacts 37 35 of the pole-changer, field-magnet winding 34 of the motor, contacts 36 38 of the pole-changer, to the negative pole of the motor. The direction of the current in the inductor is thus reversed, while the direction of the current in the field-magnet winding is unchanged. In the continued movement toward the zero position the resistances will be successively disconnected until the motor in the end position will be short-circuited, the contact-pieces 15 and 16 being simultaneously moved to the right, as before. In repeated starting the pole-changer 33 should be arranged to be replaced into the position shown by full lines, when the contact-plate is moved from the end contact 14 to the first resistance-contact 4, whereby the original motor connection will be restored immediately before or in the same moment as the circuit is closed.

Obviously the invention is not limited to the constructions shown, but may also be performed with connections where the motors are stopped by counter-current. Further, the invention may be applied to asynchronous motors, in which case the movable member of the secondary resistance is arranged to operate in its end positions pole-changers inserted in the primary circuit, so that the motor will be changed into generator when the movable member of the starting device is released at the same time as the starting resistance is connected in the circuit for being thereupon gradually disconnected until the motor is stopped, whereupon the primary circuit is broken. Such a device for a three-phase motor is diagrammatically shown in Fig. 7. 39 represents the primary member of the asynchronous motor, and 40 the secondary member of the same. The primary member is connected to the source of current by means of a switch 41 and a pole-changer 42 for automatically changing the connections of two of the phases. The secondary member is by means of switches 43, 44, and 45 connected to either of the ends of the starting resistance, the movable member of which is indicated by its short-circuiting contacts 46 and 47. The operative position is shown by full lines, the movable member of the starting device being supposed to be under the influence of a spring or the like, so that the same when released will automatically return into the zero position. The movable member of the starting device is supposed to be arranged at first to move the switches 42, 43, 44, and 45, so that the motor is changed into generator, and the whole starting resistance is connected in the circuit through the wires 48, 49, and 50 and thereupon gradually disconnected. The speed with which the movable member is returned to zero position may be regulated in such manner that the motor has practically been stopped when the end position is reached. The movable member is further supposed to be arranged to open the switch 41 and to restore the former motor connection at the switches 42 to 45, so that in a following starting the connection is suitable for the same.

Obviously the movable member of the starting device may also be arranged to be released manually.

Having now particularly described my invention and in what manner the same may be performed, what I claim as new, and desire to secure by Letters Patent, is—

1. The combination with an electric motor, of a starting device, means for locking the movable member of the said starting device in operative position, means for automatically returning the said movable member into zero position, and switches in the motor-circuit adapted to be operated by the said movable member, so as to change the motor connections, substantially as and for the purpose set forth.

2. The combination with an electric motor, of a starting device, means for locking the movable member of the said starting device in operative position, means for automatically returning the said movable member into zero position, switches in the motor-circuit adapted to be operated by the said movable member so as to change the motor connections, and means for connecting the starting resistance in the motor-circuit simultaneously with the said changing of the motor connections, substantially as and for the purpose set forth.

In testimony whereof I have signed my name to this specification in the presence of two subscribing witnesses.

ARTHUR HULTQVIST.

Witnesses:
 JACOB I. ESBJÖRNSON,
 OSCAR MALMER.